US009519189B2

(12) United States Patent
Xiao et al.

(10) Patent No.: US 9,519,189 B2
(45) Date of Patent: Dec. 13, 2016

(54) LIQUID CRYSTAL CELL, METHOD FOR FABRICATING THE SAME AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Yin Xiao, Beijing (CN); Feng Liu, Beijing (CN); Jinyang Deng, Beijing (CN); Wenzhou Li, Beijing (CN); Falun Li, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 0 days.

(21) Appl. No.: 15/099,725

(22) Filed: Apr. 15, 2016

(65) Prior Publication Data

US 2016/0334673 A1 Nov. 17, 2016

(30) Foreign Application Priority Data

May 13, 2015 (CN) .......................... 2015 1 0242997

(51) Int. Cl.

| | |
|---|---|
| ***H01J 9/20*** | (2006.01) |
| ***G02F 1/1337*** | (2006.01) |
| ***G02F 1/1339*** | (2006.01) |
| ***G02F 1/1341*** | (2006.01) |

(52) U.S. Cl.

CPC ....... *G02F 1/133788* (2013.01); *G02F 1/1339* (2013.01); *G02F 1/1341* (2013.01); *G02F 2001/13415* (2013.01)

(58) Field of Classification Search

CPC G02F 1/133788; G02F 1/1341; G02F 1/1339; G02F 2001/13415

See application file for complete search history.

(56) References Cited

U.S. PATENT DOCUMENTS

2008/0268738 A1* 10/2008 Kanai ............... G02F 1/133351 445/24
2015/0116637 A1* 4/2015 Kim ................. G02F 1/133377 349/86
2015/0248029 A1* 9/2015 Xie ....................... G02F 1/1341 118/300

* cited by examiner

*Primary Examiner* — Tracie Y Green
(74) *Attorney, Agent, or Firm* — Armstrong Teasdale LLP

(57) ABSTRACT

A method for fabricating a liquid crystal cell includes forming photosensitive-type alignment films on an upper substrate and a lower substrate respectively and removing all or part of portions of the alignment films that are located outside of display areas after performing an optical alignment on the alignment films on the upper substrate and the lower substrate. The method further includes applying a frame-sealing adhesive on areas of the upper substrate or the lower substrate that are located outside of the display areas and where there is no alignment film, dripping liquid crystal on one or more of the upper substrate and the lower substrate, cell-aligning the upper substrate and the lower substrate, curing the frame-sealing adhesive, and cutting the cell-aligned upper substrate and lower substrate into a plurality of liquid crystal cells.

20 Claims, 3 Drawing Sheets forming photosensitive-type alignment films on an upper substrate and a lower substrate respectively (101)

removing all or part of the alignment films that are located outside of display areas after performing an optical alignment on the alignment films on the upper substrate and the lower substrate (102)

applying an frame-sealing adhesive on areas of the upper substrate or the lower substrate that are located outside of the display areas and where there is no alignment film (103)

dripping liquid crystal on the upper substrate or the lower substrate and cell-aligning the upper substrate and the lower substrate (104)

curing the frame-sealing adhesive and cutting the cell-aligned upper substrate and lower substrate into a plurality of liquid crystal cells (105)

LIQUID CRYSTAL CELL, METHOD FOR FABRICATING THE SAME AND DISPLAY DEVICE

CROSS REFERENCE TO RELATED APPLICATIONS

This application claims priority of Chinese Patent Application No. 201510242997.6, filed on May 13, 2015, the entire content of which is incorporated by reference herein as a part of this application.

BACKGROUND

The embodiments of present disclosure generally relate to a field of liquid crystal display, and particularly relate to a liquid crystal cell, a method for fabricating the same and a display device.

With the development of display technology, thin film transistor liquid crystal displays have become mainstream products in the field of display devices and play a vital role in the industrial production of display devices and daily life of users of display devices.

An alignment process of an alignment film is a necessary step in the manufacture of a liquid crystal display device, and the commonly used alignment processes include a rubbing alignment process and an optical alignment process. The optical alignment process uses light exposure in a non-contact mode, which will not damage a surface of the alignment film and can achieve high contrast. Therefore, optical alignment processes are an alignment process of interest.

In the typical optical alignment process, materials for preparing the alignment film include those of photodecomposition type, isomerization type and polymerization type. The process of performing optical alignment on the alignment film using a material of photodecomposition type is relatively simple, and thus is favored by manufacturers. However, the following described problems may occur during the production process of the liquid crystal cell, of the liquid crystal display device, if an alignment film forming from a material of photodecomposition type is adopted.

It is necessary to apply a frame-sealing adhesive on an upper substrate and a lower substrate before cell-aligning, and the frame-sealing adhesive may be applied on an edge portion of the alignment film. After the upper substrate and the lower substrate are cell-aligned in vacuum, the frame-sealing adhesive needs to be cured by using an ultra-violet light and to be thermally cured. However, the adhesion between the upper substrate and the lower substrate decreases when the frame-sealing adhesive is cured by the ultra-violet light because a portion of the alignment film is irradiated by the ultra-violet light and thus is decomposed, which makes the frame-sealing adhesive lose its adhesive basis, and therefore the product yield of the liquid crystal cell decreases.

BRIEF DESCRIPTION

The embodiments described herein provide a liquid crystal cell, a method for fabricating the same and a display device, which can avoid problems of low product yield and display defect of a liquid crystal cell caused by an alignment film prepared from a decomposition-type material.

In a first aspect, embodiments described herein provide a method for fabricating a liquid crystal cell including forming photosensitive-type alignment films on an upper substrate and a lower substrate respectively, and removing all or part of the alignment films that are located outside of display areas after performing an optical alignment on the alignment films on the upper substrate and the lower substrate. The method further includes applying a frame-sealing adhesive on areas of the upper substrate or the lower substrate that are located outside of the display areas and where there is no alignment film, dripping liquid crystal on the upper substrate or the lower substrate and cell-aligning the upper substrate and the lower substrate, and curing the frame-sealing adhesive and cutting the cell-aligned upper substrate and lower substrate into a plurality of liquid crystal cells.

In the first aspect, for the upper substrate and the lower substrate of the liquid crystal cell, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

In one embodiment, removing all or part of the alignment films that are located outside of display areas after performing an optical alignment on the alignment films on the upper substrate and the lower substrate includes performing a first exposure on the alignment films on the upper substrate and the lower substrate respectively by using an ultra-violet light source such that the alignment films have a prescribed orientation, providing a mask and performing a second exposure on the alignment films on the upper substrate and the lower substrate respectively by using an ultra-violet light source such that all or part of the alignment films that are located outside of the display areas are decomposed, and curing and cleaning the alignment films on the upper substrate and the lower substrate such that all or part of the alignment films that are located outside of the display areas are removed.

In another embodiment, before applying the frame-sealing adhesive, the second exposure is performed on the alignment films using the mask such that all or part of the alignment films that are located outside of the display areas are decomposed and then are removed by cleaning, thereby the application of the frame-sealing adhesive will not be restricted by the alignment films and is beneficial to achieving a narrow frame.

In certain embodiments, the first exposure is an exposure to the alignment films on the upper substrate and the lower substrate for the first time, and the second exposure is an exposure to the alignment films on the upper substrate and the lower substrate for the second time.

In another embodiment, the mask has a plurality of shielding portions that are in one-to-one correspondence to the display areas, and vertical projections of the shielding portions on the upper substrate and the lower substrate coincide with or are beyond their corresponding display areas. The shielding portions are used to prevent light of the ultra-violet light source from passing through.

In another embodiment, a distance between an edge of vertical projections of the shielding portions on the upper substrate and the lower substrate and an edge of the display areas is 0~8000 μm.

In another embodiment, curing and cleaning the alignment films on the upper substrate and the lower substrate includes curing the alignment films on the upper substrate and the lower substrate by using an infrared heating furnace or a hot-blast stove at a curing temperature of 100° C.~300° C. for a curing period of 100~7200 seconds and cleaning the alignment films on the upper substrate and the lower substrate through ultrasonic wave by using isopropyl alcohol, propylene glycol methyl ether acetate, or ozone water as a cleaning solution.

In another embodiment, the ultra-violet light source comprises a high-pressure mercury lamp, a metal halide lamp or an ultra-violet LED lamp.

In another embodiment, an emission wavelength of the ultra-violet light source is in a range of 100~800 nm.

In another embodiment, a luminescent spectrum of the ultra-violet LED lamp is a single-peak spectrum in which a wavelength corresponding to a peak is 254 nm, 313 nm or 365 nm. In the exemplary embodiment, by using an ultra-violet LED lamp to perform the exposure and the alignment on the alignment films, the uniformity of the alignment is increased and the power consumption of the ultra-violet LED lamp is low, which can save the cost.

In some of the embodiments of the first aspect, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

In a second aspect, a liquid crystal cell fabricated by the methods described herein is provided.

In some embodiments, for the upper substrate and the lower substrate of the liquid crystal cell, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

In a third aspect, a display device including the liquid crystal cell described herein is provided.

In some embodiments, for the upper substrate and the lower substrate of the liquid crystal cell, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

BRIEF DESCRIPTION OF THE DRAWINGS

For the sake of describing the technical solutions of the embodiments described herein more clearly, the accompany drawings of the exemplary embodiments will be briefly introduced below, and are not a limitation to the embodiments described herein.

DETAILED DESCRIPTION

The implementation process of embodiments of the present invention will be described in detail hereinafter in conjunction with the accompany drawings. It should be noted that the same or similar reference numbers always indicate the same or similar elements or elements having the same or similar functions. The embodiments described hereinafter by reference to the accompany drawings are exemplary and are only for explaining the present invention, but should not be understood to limit the present invention.

In the description of the present disclosure, it should be noted that the position or location relationship indicated by the terms "upper" and "lower" are based on the position or location relationship illustrated by the accompany drawings, which is merely for ease of describing the present disclosure and simplifying the description, but do not intend to indicate or hint that the indicated structures must have the certain position and must construct and operate in the certain position, and therefore, should not be understood to limit the present disclosure.

Figure 1:
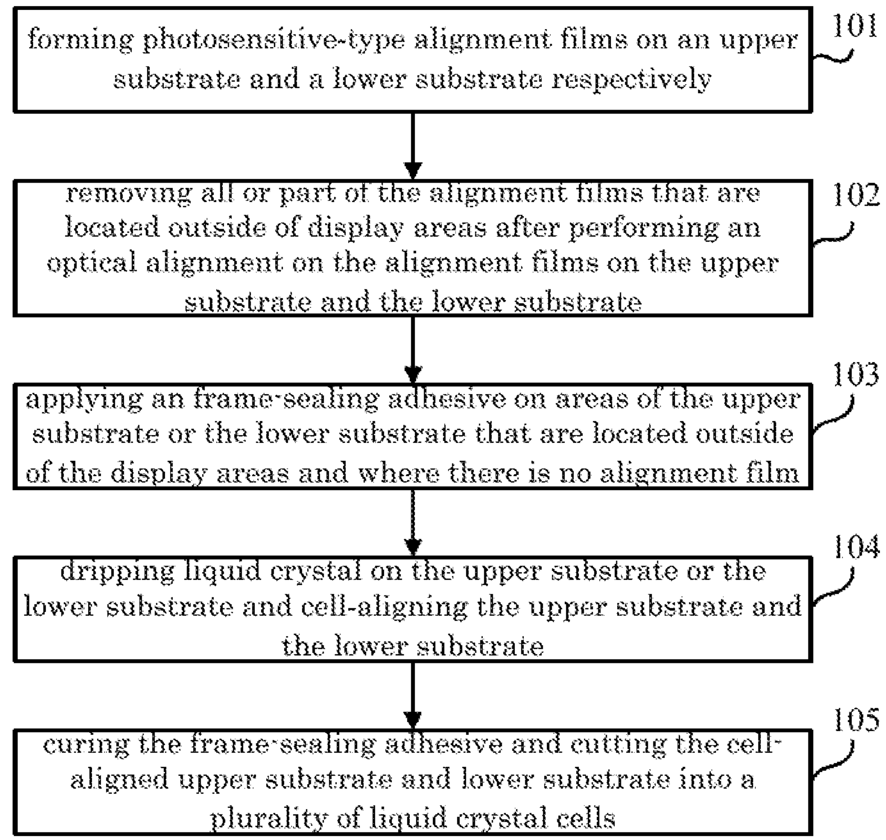
FIG. 1 is a flow chart of an exemplary method for fabricating a liquid crystal cell.
Figure 2:
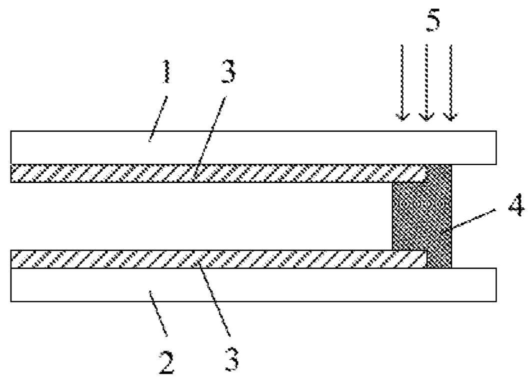
FIG. 2 is a schematic view of curing a frame-sealing adhesive by using an ultra-violet light.
Figure 3:
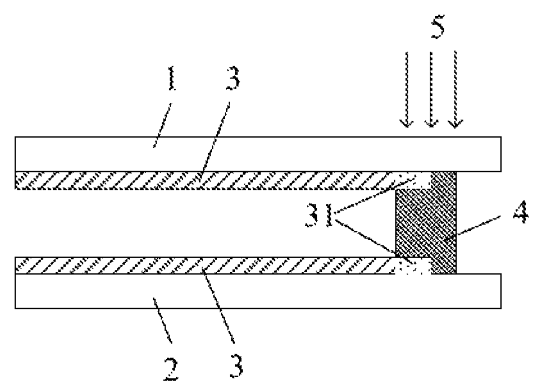
FIG. 3 is a schematic view of the decomposition of alignment films when curing the frame-sealing adhesive by using an ultra-violet.

Referring to FIG. 1, the embodiments described herein provide a method for fabricating a liquid crystal cell including steps 101 to 105. The method described addresses weak adhesion and contamination of liquid crystal cells prepared using typical methods. As shown in FIGS. 2 and 3, when a frame-sealing adhesive 4 is cured by using an ultra-violet light 5 after an upper substrate 1 and a lower substrate 2 are cell-aligned, it is possible that a portion of an alignment film 3 is decomposed to form a decomposed alignment material 31. This makes the frame-sealing adhesive 4 lose its adhesive basis and thus the adhesion between the upper substrate 1 and the lower substrate 2 decreases. Furthermore, in a case of high temperature and high humidity, water vapor may infiltrate into the cell from the frame-sealing interface having weak adhesion and contaminate the liquid crystal, which causes the defect of display Mura occurred in the periphery of the display device. The following method, described with reference to FIG. 1, addresses these deficiencies.

In step 101, photosensitive-type alignment films are formed respectively on an upper substrate and a lower substrate.

In certain embodiments, the alignment films may be formed on the upper substrate and the lower substrate by using relief printing or ink-jet printing. When preparing the alignment films, it is desirable to make the alignment films cover all the display areas, otherwise a display defect may occur. However, the alignment films cannot be formed to be completely in coincidence with the display areas due to the process precision, and therefore the alignment films are formed beyond the display areas so as to ensure that the alignment films covers all the display areas.

In step 102, all or part of the alignment films that are located outside of the display areas are removed after performing an optical alignment on the alignment films on the upper substrate and the lower substrate.

An ultra-violet light source may be used to perform the optical alignment on the alignment films. The ultra-violet light may be a high-pressure mercury lamp, a metal halide lamp or an ultra-violet LED lamp, and an emission wavelength of the ultra-violet light source may be in a range of 100~800 nm. According to an exemplary embodiment, an ultra-violet LED lamp is used as the light source of the optical alignment process. The ultra-violet LED lamp has uniform brightness and low power consumption, which can increase the alignment uniformity of the alignment films so as to avoid the phenomenon of the Mura defect or the like of the display device and save.

According to an exemplary embodiment, a luminescent spectrum of the ultra-violet LED lamp is a single-peak spectrum in which a wavelength corresponding to the peak is 254 nm, 313 nm or 365 nm. By using the ultra-violet LED lamp as the light source for exposure, it is unnecessary to perform a complicated filtration process on the light so as to avoid the adverse impact on the alignment films due to the light having various wavelengths.

Taking the ultra-violet LED lamp as an example, a specific process of the optical alignment and the removal of the alignment films may include the following steps 1 to 3.

In step 1, a first exposure is performed respectively on the alignment films on the upper substrate and the lower substrate by using the ultra-violet LED lamp such that the alignment films have a prescribed orientation. In the alignment process, the accumulated amount of the light of the ultra-violet LED lamp may be 20 mJ/cm2~5000 mJ/cm2. By using the ultra-violet LED lamp to perform the exposure and the alignment on the alignment films, the uniformity of the alignment is increased and the power consumption of the ultra-violet LED lamp is low, which can save cost.

In step 2, a mask is provided and a second exposure is performed respectively on the alignment films on the upper substrate and the lower substrate by using the ultra-violet LED lamp such that all or part of the alignment films that are located outside of the display areas are decomposed. In the second exposure, the accumulated amount of the light of the ultra-violet LED lamp may be 20 mJ/cm2~30000 mJ/cm2.

When performing the second exposure on the alignment films, the adopted mask may satisfy the following conditions: the mask has a plurality of shielding portions that are in one-to-one correspondence to the display areas, and the vertical projections of the shielding portions on the upper substrate and the lower substrate coincide with or are beyond their corresponding display areas; the shielding portions are used to prevent the light of the ultra-violet light source from passing through. Because the shielding portions of the mask block the light of the ultra-violet light source, the alignment films within the display areas are not affected.

In step 3, curing and cleaning the alignment films on the upper substrate and the lower substrate is performed so as to remove all or part of the alignment films that are located outside of the display areas.

An infrared heating furnace or a hot-blast stove may be used to cure the alignment films on the upper substrate and the lower substrate at a curing temperature of 100° C.~300° C. for a curing period of 100~7200 seconds. The alignment films on the upper substrate and the lower substrate may be cleaned through ultrasonic wave cleaning and/or by using isopropyl alcohol, propylene glycol methyl ether acetate, or ozone water as a cleaning solution.

Furthermore, in the cleaning process of the step 3, the parts needed to be removed in the alignment performed in the first exposure on the alignment films are cleaned simultaneously, which will not be repeated herein.

It should be noted that taking the ultra-violet LED lamp as an example in the exemplary embodiment is only for illustration, not for limiting thereto. A high-pressure mercury lamp, a metal halide lamp or other light sources that satisfy the requirements may also be used to perform the first exposure and the second exposure, or different ultra-violet light sources may be used respectively in the first exposure and the second exposure, which will not be repeated herein.

In step 103, the frame-sealing adhesive is applied on the areas of the upper substrate or the lower substrate that are located outside of the display areas and where there is no alignment film.

Since the frame-sealing adhesive is applied on the area where there is no alignment film, the frame-sealing adhesive is not restricted by the alignment film. Firstly, this results in avoiding the problem of weak adhesion due to the decomposition of the alignment film on or under the frame-sealing adhesive. Secondly, this results in avoiding the problem of display defects in the display device due to water vapor entering from the frame-sealing interface, thereby the product yield is increased. Thirdly and as a result of the process described herein, it is possible for the design of a narrow frame to have more space.

In step 104, liquid crystal is dripped on the upper substrate or the lower substrate and the upper substrate and the lower substrate are cell-aligned.

In step 105, the frame-sealing adhesive is cured and the cell-aligned upper substrate and the lower substrate are cut into a plurality of liquid crystal cells.

For ease of understanding the exemplary method for fabricating the liquid crystal cell described above, the second exposure in step 2 is illustrated in conjunction with FIGS. 4 to 7.

Figure 4:
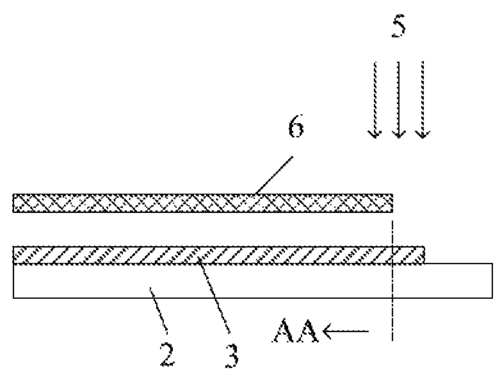
FIG. 4 is a schematic view of a second exposure to an alignment film on a lower substrate using a mask and an ultra-violet light in an exemplary embodiment.

As shown in FIG. 4, an exposure is performed on the alignment film 3 on the lower substrate 2 with a mask 6 by using an ultra-violet light 5, and the mask 6 shields at least the alignment film 3 within the display area AA so that the alignment film 3 in the display area will not be affected by the ultra-violet light 5.

Figure 5:
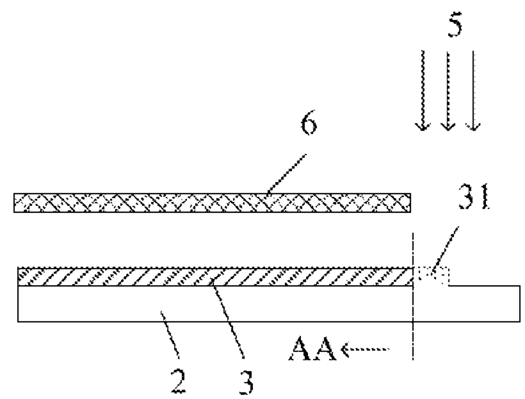
FIG. 5 is a schematic view after the second exposure to the alignment film on the lower substrate using the mask and the ultra-violet light.

As shown in FIG. 5, the alignment film 3 that is located outside of the shielded region of the mask 6 is decomposed into the decomposed alignment film material 31 after being irradiated by the ultra-violet light 5.

Figure 6:
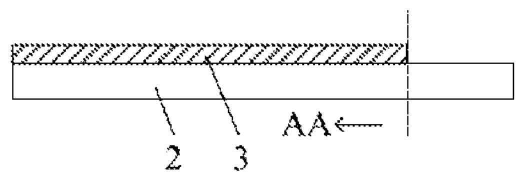
FIG. 6 is a schematic view of removing the alignment film on the lower substrate after the second exposure in an exemplary embodiment.

As shown in FIG. 6, the decomposed alignment film material 31 as shown in the FIG. 5 has been removed through the curing and cleaning process.

Figure 7:
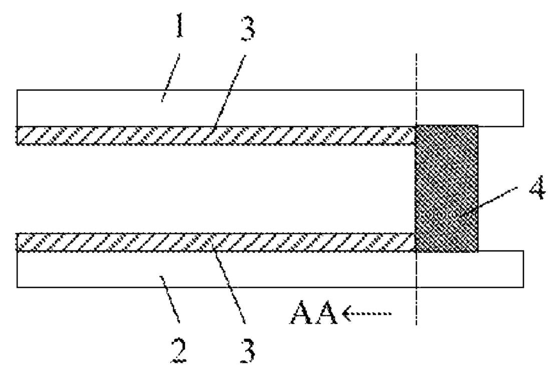
FIG. 7 is a schematic view of a liquid crystal cell formed after the cell-alignment of the upper substrate and the lower substrate.

Illustration is made by taking the lower substrate 2 as an example in FIGS. 4 to 6, and for the upper substrate 1, the same method is applied. The schematic view of the upper substrate 1 and the lower substrate 2 after being applied with the frame-sealing adhesive 4 and being cell-aligned is shown in FIG. 7. Because there is no alignment film 3 right on or right under the frame-sealing adhesive 4, the frame-sealing adhesive 4 will not be affected by the alignment film 3.

It should be noted that the upper substrate 1 and the lower substrate 2 in the embodiments of the present disclosure may be understood as corresponding to a motherboard of a color filter substrate and a motherboard of an array substrate for a plurality of liquid crystal cells.

With the embodiments described herein, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

In further embodiments a liquid crystal cell is fabricated by the fabricating method described herein.

For the upper substrate and the lower substrate of the liquid crystal cell, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

In some embodiments a display device is fabricated using a liquid crystal cell of the type described herein and fabricated using the methods described herein.

For the upper substrate and the lower substrate of the liquid crystal cell included in the display device, all or part of the alignment films that are located outside of the display areas are removed before the frame-sealing adhesive is applied, and the frame-sealing adhesive is applied on the areas of the upper substrate or the lower substrate that are located outside of the display areas and where there is no alignment film so as to make the frame-sealing adhesive not adhere to the alignment films. Therefore when curing the frame-sealing adhesive by using the ultra-violet light, the problem of weak adhesion due to the decomposition of the alignment film on or under the frame-sealing adhesive is avoided and the problem of display defect of the display device due to the entering of water vapor from the frame-sealing interface is avoided, thereby the product yield is increased.

Obviously, those skilled in the art may make various alterations and modifications to the present invention without departing from the spirit and scope of the present invention. Therefore, if the alterations and modifications belong to the scope of the claims of the present invention and its equivalent technologies, the present invention intends to include such alterations and modifications.

What is claimed is:

1. A method for fabricating a liquid crystal cell comprising:

forming photosensitive-type alignment films on an upper substrate and a lower substrate respectively;

removing all or part of portions of the alignment films that are located outside of display areas after performing an optical alignment on the alignment films on the upper substrate and the lower substrate;

applying a frame-sealing adhesive on areas of the upper substrate or the lower substrate that are located outside of the display areas and where there is no alignment film;

dripping liquid crystal on one or more of the upper substrate and the lower substrate, and cell-aligning the upper substrate and the lower substrate; and curing the frame-sealing adhesive and cutting the cell-aligned upper substrate and lower substrate into a plurality of liquid crystal cells.

2. The method according to claim 1, wherein removing all or part of portions of the alignment films that are located outside of display areas after performing an optical alignment on the alignment films on the upper substrate and the lower substrate comprises:

performing a first exposure on the alignment films on the upper substrate and the lower substrate respectively by using an ultra-violet light source such that the alignment films have a prescribed orientation;

providing a mask and performing a second exposure on the alignment films on the upper substrate and the lower substrate respectively by using an ultra-violet light source such that all or part of the portions of the alignment films that are located outside of the display areas are decomposed; and curing and cleaning the alignment films on the upper substrate and the lower substrate such that all or part of the portions of the alignment films that are located outside of the display areas are removed.

3. The method according to claim 2, wherein the mask has a plurality of shielding portions that correspond to the display areas, and vertical projections of the plurality of shielding portions on the upper substrate and the lower substrate coincide with or are positioned beyond corresponding display areas;

wherein the plurality of shielding portions prevent light of the ultra-violet light source from passing through the plurality of shielding portions.

4. The method according to claim 3, wherein a distance between an edge of each of the vertical projections of the plurality of shielding portions on the upper substrate and the lower substrate and an edge of the display areas is between and inclusive of approximately 0 and approximately 8000 micrometers (μm).

5. The method according to claim 2, wherein curing and cleaning the alignment films on the upper substrate and the lower substrate comprises:

curing the alignment films on the upper substrate and the lower substrate by using one or more of an infrared heating furnace and a hot-blast stove at a curing temperature between and inclusive of 100 and 300 degrees centigrade (° C.) for a curing period between and inclusive of approximately 100 and approximately 7200 seconds; and cleaning the alignment films on the upper substrate and the lower substrate through ultrasonic wave cleaning by using one or more of isopropyl alcohol, propylene glycol methyl ether acetate, and ozone water as a cleaning solution.

6. The method according to claim 2, wherein the ultra-violet light source comprises one or more of a high-pressure mercury lamp, a metal halide lamp and an ultra-violet LED lamp.

7. The method according to claim 3, wherein the ultra-violet light source comprises one or more of a high-pressure mercury lamp, a metal halide lamp and an ultra-violet LED lamp.

8. The method according to claim 6, wherein an emission wavelength of the ultra-violet light source is between and inclusive of approximately 100 and approximately 800 nanometers (nm).

9. The method according to claim 7, wherein an emission wavelength of the ultra-violet light source is between and inclusive of approximately 100 and approximately 800 nanometers (nm).

10. The method according to claim 8, wherein a luminescent spectrum of the ultra-violet LED lamp is a single-peak spectrum in which a wavelength corresponding to a peak is one or more of 254 nm, 313 nm and 365 nm.

11. The method according to claim 9, wherein a luminescent spectrum of the ultra-violet LED lamp is a single-peak spectrum in which a wavelength corresponding to a peak is one or more of 254 nm, 313 nm and 365 nm.

12. A liquid crystal cell, which is fabricated by the method according to claim 1.

13. A liquid crystal cell, which is fabricated by the method according to claim 2.

14. A liquid crystal cell, which is fabricated by the method according to claim 3.

15. A liquid crystal cell, which is fabricated by the method according to claim 4.

16. A liquid crystal cell, which is fabricated by the method according to claim 5.

17. A display device comprising the liquid crystal cell according to claim 12.

18. A display device comprising the liquid crystal cell according to claim 13.

19. A display device comprising the liquid crystal cell according to claim 14.

20. A display device comprising the liquid crystal cell according to claim 15.

* * * * *